United States Patent
Yuan et al.

(10) Patent No.: US 11,899,550 B2
(45) Date of Patent: Feb. 13, 2024

(54) ENHANCED AUXILIARY MEMORY MAPPED INTERFACE TEST SYSTEMS AND METHODS

(71) Applicant: Advantest Corporation, Tokyo (JP)

(72) Inventors: Chi Yuan, San Jose, CA (US); Srdjan Malisic, San Jose, CA (US)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 17/161,417

(22) Filed: Jan. 28, 2021

(65) Prior Publication Data
US 2021/0303430 A1   Sep. 30, 2021

Related U.S. Application Data (60) Provisional application No. 63/003,013, filed on Mar. 31, 2020.

(51) Int. Cl.
| | | |
|---|---|---|
| *G06F 11/273* | (2006.01) | |
| *G06F 13/42* | (2006.01) | |
| *G06F 13/16* | (2006.01) | |

(52) U.S. Cl.
CPC ...... *G06F 11/2733* (2013.01); *G06F 13/1668* (2013.01); *G06F 13/4282* (2013.01); *G06F 2213/0026* (2013.01)

(58) Field of Classification Search
CPC .............. G06F 11/2733; G06F 11/273; G06F 11/2736; G06F 11/277
See application file for complete search history.

(56) References Cited

U.S. PATENT DOCUMENTS

| | | | |
|---|---|---|---|
| 5,659,680 A | 8/1997 | Cunningham et al. | |
| 6,311,149 B1 * | 10/2001 | Ryan | G06F 11/2733 |
| | | | 703/23 |

(Continued)

FOREIGN PATENT DOCUMENTS

| | | |
|---|---|---|
| CN | 101073016 | 11/2007 |
| CN | 103038751 | 4/2013 |

(Continued)

OTHER PUBLICATIONS

Wikipedia's Memory-Mapped I/O historical version published Nov. 17, 2019 https://en.wikipedia.org/w/index.php?title=Memory-mapped_I/O&oldid=926565333 (Year: 2019).*

(Continued)

*Primary Examiner* — Joseph O Schell (57) ABSTRACT

Presented embodiments facilitate efficient and effective flexible implementation of different types of testing procedures in a test system. Presented embodiments facilitate efficient and effective flexible implementation of different types of testing procedures in a test system. In one embodiment, an enhanced auxiliary interface test system comprises a load board, testing electronics, controller, and memory mapped interface. The load board is configured to couple with a plurality of devices under test (DUTs). The testing electronics is configured to test the plurality of DUTs, wherein the testing electronics are coupled to the load board. The controller is configured to direct testing of the DUTs, wherein the controller is coupled to the testing electronics. The memory mapped interface is configured to implement multiple paths to access a central processing unit (CPU) on the controller and enable testing of multiple DUTs in parallel.

17 Claims, 7 Drawing Sheets

(56) References Cited

U.S. PATENT DOCUMENTS

| | | | |
|---|---|---|---|
| 6,671,844 B1* | 12/2003 | Krech, Jr. | G11C 29/56 714/736 |
| 6,687,855 B1 | 2/2004 | Krech, Jr. et al. | |
| 2003/0093764 A1* | 5/2003 | Devins | G06F 30/33 716/106 |
| 2004/0068699 A1 | 4/2004 | Morris et al. | |
| 2005/0102589 A1 | 5/2005 | Park et al. | |
| 2007/0271059 A1 | 11/2007 | Vonstaudt | |
| 2008/0049514 A1 | 2/2008 | Mondello et al. | |
| 2010/0023294 A1 | 1/2010 | Fan et al. | |
| 2013/0138383 A1* | 5/2013 | Filler | G06F 17/00 702/123 |
| 2015/0135026 A1* | 5/2015 | Lai | G11C 29/08 714/718 |
| 2017/0075611 A1 | 3/2017 | Choi et al. | |
| 2017/0147461 A1* | 5/2017 | Carmichael | G06F 11/2733 |
| 2017/0337069 A1* | 11/2017 | Huang | G06F 13/4282 |
| 2018/0039554 A1* | 2/2018 | Wang | G11C 29/56 |
| 2018/0188322 A1 | 7/2018 | Rogel-Favila et al. | |
| 2018/0189159 A1 | 7/2018 | Carmichael et al. | |
| 2018/0252772 A1* | 9/2018 | Detofsky | G01R 31/31908 |
| 2018/0313889 A1 | 11/2018 | Su et al. | |
| 2019/0278586 A1* | 9/2019 | Olarig | G06F 8/654 |
| 2019/0353696 A1 | 11/2019 | Hsu et al. | |
| 2020/0033408 A1 | 1/2020 | Rogel-Favila et al. | |
| 2021/0216388 A1* | 7/2021 | Kumar | G06F 11/079 |
| 2022/0157399 A1* | 5/2022 | Hensel | G01R 31/31908 |

FOREIGN PATENT DOCUMENTS

| | | | | |
|---|---|---|---|---|
| CN | 104156333 A | * | 11/2014 | |
| CN | 105144144 | | 12/2015 | |
| CN | 110287074 A | * | 9/2019 | G06F 11/2205 |
| CN | 110502374 | | 11/2019 | |
| CN | 110618993 | | 12/2019 | |
| EP | 3264280 A1 | * | 1/2018 | G06F 13/20 |
| KR | 10-2007-0106692 A | | 11/2007 | |
| KR | 10-2018-0111492 A | | 10/2018 | |
| KR | 10-2020-0032650 A | | 3/2020 | |
| TW | 200535440 | | 11/2005 | |
| TW | 201504647 A | | 2/2015 | |
| TW | 201833570 A | | 9/2018 | |
| TW | 201840996 A | | 11/2018 | |
| TW | 201907174 | | 2/2019 | |

OTHER PUBLICATIONS

Wikipedia's NVM Express historical version published Mar. 30, 2020 https://en.wikipedia.org/w/index.php?title=NVM_Express&oldid=948211037 (Year: 2020).*

Understanding M.2, the interface that will speed up your next SSD by Andrew Cunningham published Feb. 8, 2015 https://arstechnica.com/gadgets/2015/02/understanding-m-2-the-interface-that-will-speed-up-your-next-ssd/ (Year: 2015).*

* cited by examiner

| 310<br>Memory Address Range | 320<br>Assignment Data |
|---|---|
| 311<br>Memory Address Range<br>(e.g., Memory Address 10,000<br>to 40,000, etc.) | 321<br>Assignment Identifier<br>(e.g., assigned to DUT 331, etc.) |
| 312<br>Memory Address Range<br>(e.g., Memory Address 40,001<br>to 250,000, etc.) | 322<br>Assignment Identifier<br>(e.g., assigned to testing<br>system operations 342, etc.) |
| 313<br>Memory Address Range<br>(e.g., Memory Address 250,001<br>to 490,000, etc.) | 323<br>Assignment Identifier<br>Assignment Identifier<br>(e.g., assigned to DUT 333, etc.) |
| 314<br>Memory Address Range<br>(e.g., Memory Address 490,001<br>to 2,250,000, etc.) | 324<br>Assignment Identifier<br>(e.g., assigned to testing<br>system operations 344, etc.) |

ENHANCED AUXILIARY MEMORY MAPPED INTERFACE TEST SYSTEMS AND METHODS

RELATED APPLICATIONS

This application claims the benefit of and priority to provisional application 63/003,013 entitled Enhanced Auxiliary Interface Test systems and Methods filed Mar. 31, 2020, which is incorporated herein by reference.

FIELD OF THE INVENTION

The present invention relates to the field of electronic testing.

BACKGROUND OF THE INVENTION

Electronic systems and devices have made a significant contribution towards the advancement of modern society and have facilitated increased productivity and reduced costs in analyzing and communicating information in a variety of business, science, education, and entertainment applications. Conventional testing systems and methods often have various limitations.

Conventional CPU platforms (e.g., Intel x86 architecture platform, etc.) typically have limits on the input output I/O space. The I/O space limitations in turn limit the number of devices that can be tested in parallel on the same interface. For instance, UART devices located behind the PCIe switch will typically not allow more than 10 or 12 devices to be used in parallel.

SUMMARY

Presented embodiments facilitate efficient and effective flexible implementation of different types of testing procedures in a test system. In one embodiment, an enhanced auxiliary interface test system comprises a load board, testing electronics, controller, and memory mapped interface. The load board is configured to couple with a plurality of devices under test (DUTs). The testing electronics is configured to test the plurality of DUTs, wherein the testing electronics are coupled to the load board. The controller is configured to direct testing of the DUTs, wherein the controller is coupled to the testing electronics. The memory mapped interface is configured to implement multiple paths to access a central processing unit (CPU) on the controller and enable testing of multiple DUTs in parallel.

In one embodiment, the DUTs are NVMe devices with a universal asynchronous receiver-transmitter (UART) UART interface. The DUTs can be PCIe Non Volatile Memory Express (NVMe) solid state drives (SSDs). The UART enhanced auxiliary interface can be used for debug purposes. The PCIe NVMe devices can have a universal asynchronous receiver-transmitter (UART) auxiliary interface over PCIe. The controller provides for test systems with multi-function devices that can work in an environment with multiple DUTs per CPU. The memory mapped interface is supported by modifications to an FPGA, drivers, and user space. The memory map interface enables the number of serial buses to increase beyond limitations of an I/O space address of the controller, which in turn enables more devices to be connected and tested at least in part concurrently or in parallel.

In one embodiment, an enhanced interface method comprises coupling a plurality of DUTs to a loadboard, testing the plurality of DUTs coupled to the loadboard, configuring multiple paths for access to a CPU and testing the plurality of DUTs in parallel, wherein the configuring utilizes a flexible enhanced auxiliary interface; and directing testing of the plurality of DUTs in accordance with the multiple paths. In one embodiment, the DUTs are NVMe devices with a universal asynchronous receiver-transmitter (UART) UART interface. The directing testing of the plurality of DUTs includes directing debug operations. The directing testing of the plurality of DUTs included providing for test systems with multi-function devices that can work in an environment with multiple DUTs per CPU. The configuring multiple paths for access to the CPU enables the number of serial buses to increase beyond limitations of an I/O space address of the CPU. The configuring of the multiple paths for access to the CPU novel flexible memory mapped interface is utilized rather than a limited I/O space approach. The DUTs are Non Volatile Memory Express (NVMe) solid state drives (SSDs).

In one embodiment, an enhanced interface system comprises a load board configured to couple with a plurality of devices under test (DUTs), testing electronics configured to test the plurality of NVMe devices with a universal asynchronous receiver-transmitter (UART) UART interface, wherein the testing electronics are coupled to the load board, a controller configured to direct testing of the DUTs, wherein the controller is coupled to the testing electronics, and a flexible enhanced auxiliary interface configured to implement multiple paths to access a central processing unit (CPU) on the controller and enable testing of multiple NVMe devices in parallel. In one exemplary implementation, the plurality of NVMe devices implement the universal asynchronous receiver-transmitter (UART) UART interface over PCIe. The DUTs can be Non Volatile Memory Express (NVMe) solid state drives (SSDs). In one exemplary implementation, the DUTs are PCIe Non Volatile Memory Express (NVMe) solid state drives (SSDs). The flexible enhanced auxiliary interface includes memory mapped interface. The number of DUTs to be to be tested in parallel is not constrained by CPU I/O space limitations. The flexible enhanced auxiliary interface provides for test systems with multi-function devices that can work in an environment with multiple DUTs per CPU.

DESCRIPTION OF THE DRAWINGS

The accompanying drawings, which are incorporated in and form a part of this specification, are included for exemplary illustration of the principles of the present invention and not intended to limit the present invention to the particular implementations illustrated therein. The drawings are not to scale unless otherwise specifically indicated.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Presented embodiments facilitate convenient and efficient testing of electronic devices. The presented systems and methods are directed to enhanced auxiliary interface systems and methods that facilitate efficient and effective testing of large numbers of devices under test (DUTs). The enhanced auxiliary interface systems and methods provide novel communication paths between DUTs and a system (e.g., CPU, computer system, etc.) enabling increased parallelism (e.g., more DUTs tested per CPU, etc.). In one embodiment the DUTs can be Non Volatile Memory Express (NVMe) solid state drives (SSDs). The NVMe devices can have a universal asynchronous receiver-transmitter (UART) auxiliary interface. In one embodiment, the enhanced auxiliary interface systems and methods include a memory map interface scheme to overcome I/O space limitations and improve I/O parallelism.

Figure 1:
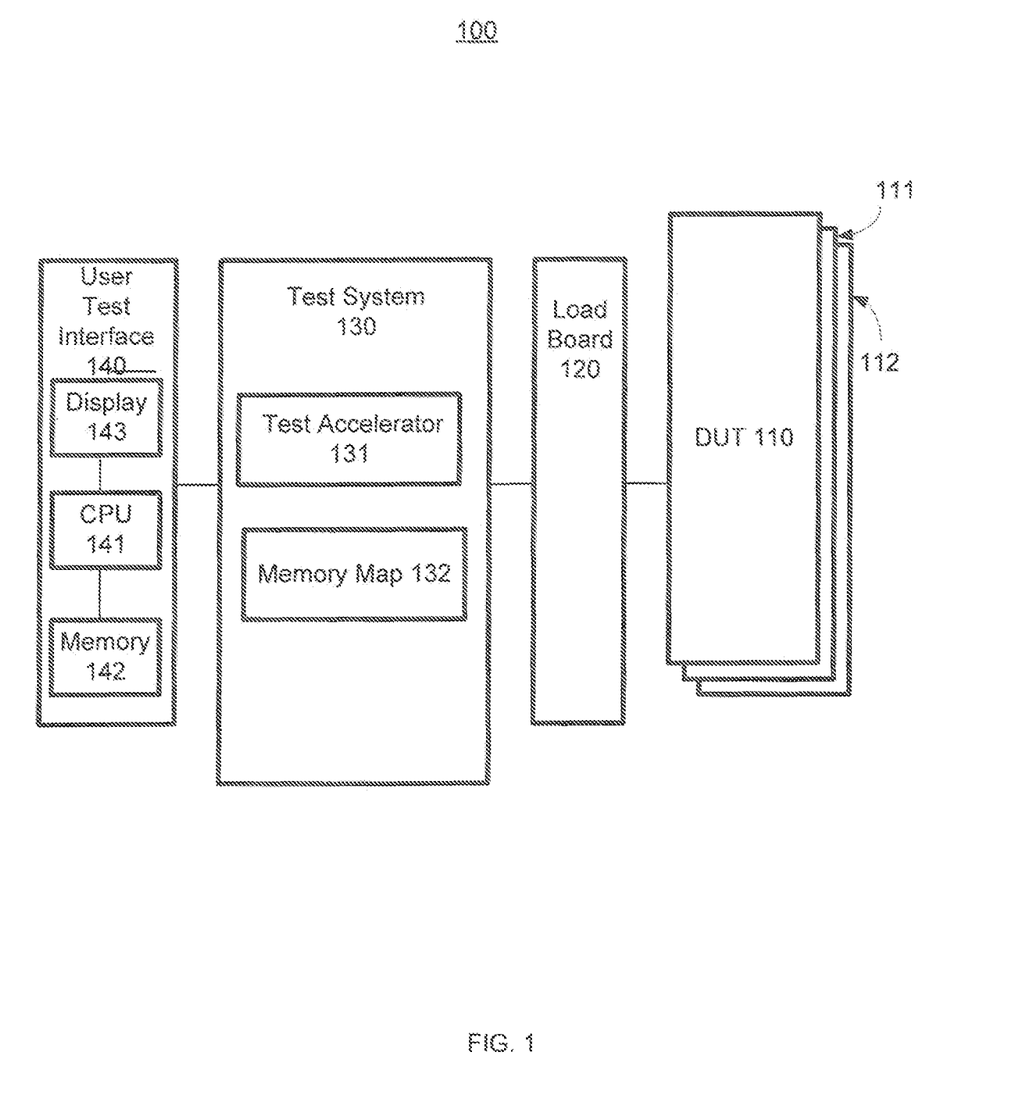
FIG. 1 is a block diagram of an exemplary test environment or system in accordance with one embodiment.

FIG. 1 is a block diagram of an exemplary enhanced auxiliary interface test system 100 in accordance with one embodiment. The enhanced auxiliary interface test environment or system 100 includes devices under test (e.g., 110, 111, 112, etc.), loadboard 120, test system 130, and user test interface 140. The devices under test (e.g., 110, 111, 112, etc.) are coupled to the test board or load board 120, which is coupled to test system 130, which in turn is coupled to the user interface 140. User test interface 140 includes CPU 141, memory 142, and display 143. In one embodiment, the test system 130 comprises a Field Programmable Gate Array (FPGA) component that includes a test accelerator 131. The FPGA is configured to perform preliminary analysis of persistent test information. Loadboard 120 is configured to electrically and physically couple a device under test to the test system.

The invention provides a novel route through a memory mapped interface (e.g., included in a switch based system, etc.) that is utilized to develop/implement multiple new paths to access a CPU. The enhanced auxiliary interface systems and methods provide for multi-function devices that can work in an environment with multiple DUTs (e.g., 16) per CPU. In one embodiment, the memory mapped interface is supported by modifications to the FPGA, drivers, and user space. The memory map interface scheme enables the number of serial buses (e.g., UART, etc.) to increase, which in turn enables more devices to be connected and therefore tested at least in part concurrently or in parallel. In one exemplary implementation, a UART enhanced auxiliary interface can be used for debug purposes, and so on.

Figure 2:
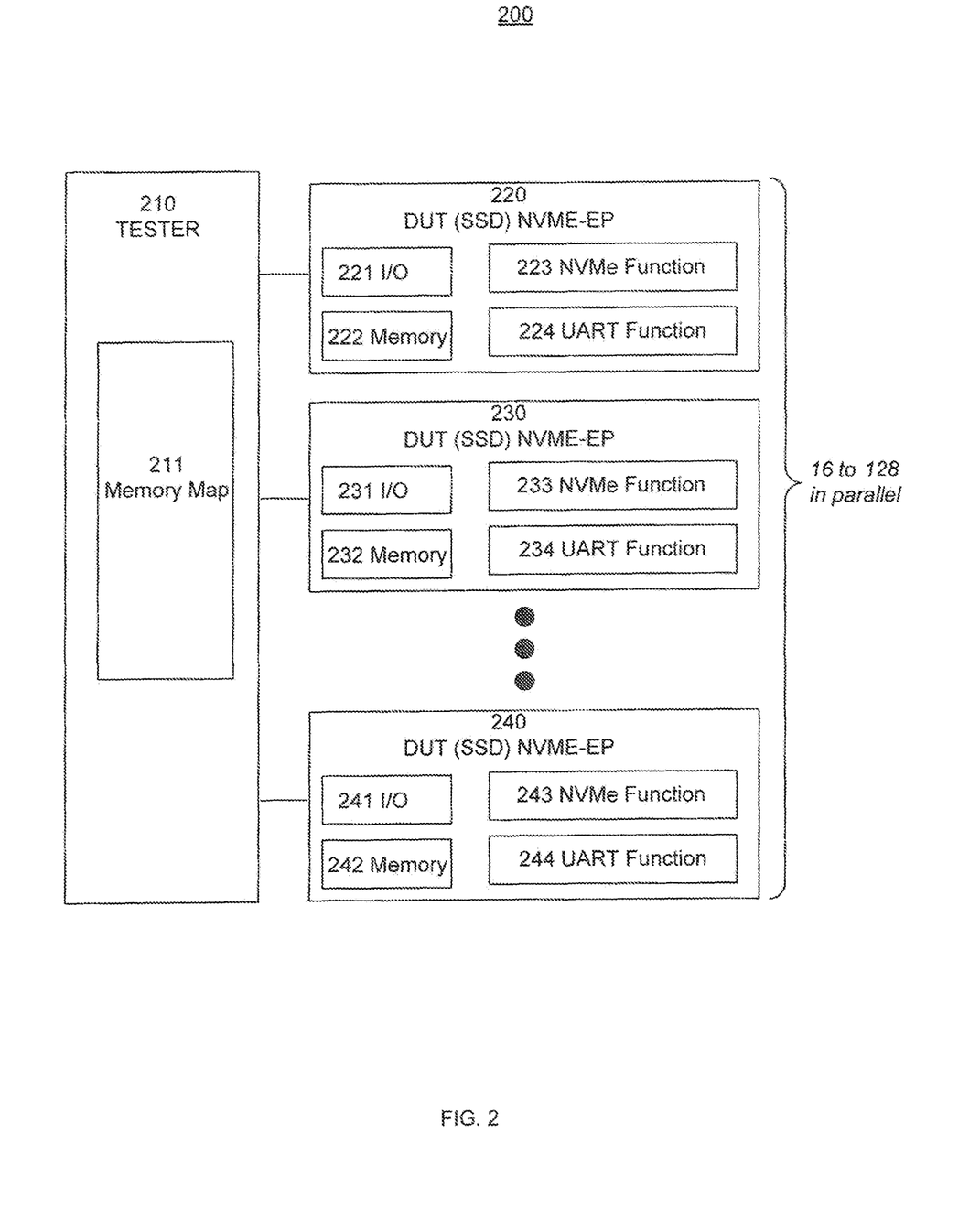
FIG. 2 is a block diagram of an enhanced interface system in accordance with one embodiment.

FIG. 2 is a block diagram of an enhanced interface system in accordance with one embodiment. Enhanced interface system 200 includes tester 210 coupled to DUTs 220, 230, and 240. Tester 210 includes tester 211. DUT 220 includes I/O 221, Memory 222, NVME function 223, and 224 UART function. DUT 230 includes I/O 231, Memory 232, NVME function 233, and 234 UART function. DUT 240 includes I/O 241, Memory 242, NVME function 243, and 244 UART function. In one embodiment, tester 210 can test 16 to 128 DUTs in parallel.

Figure 3:
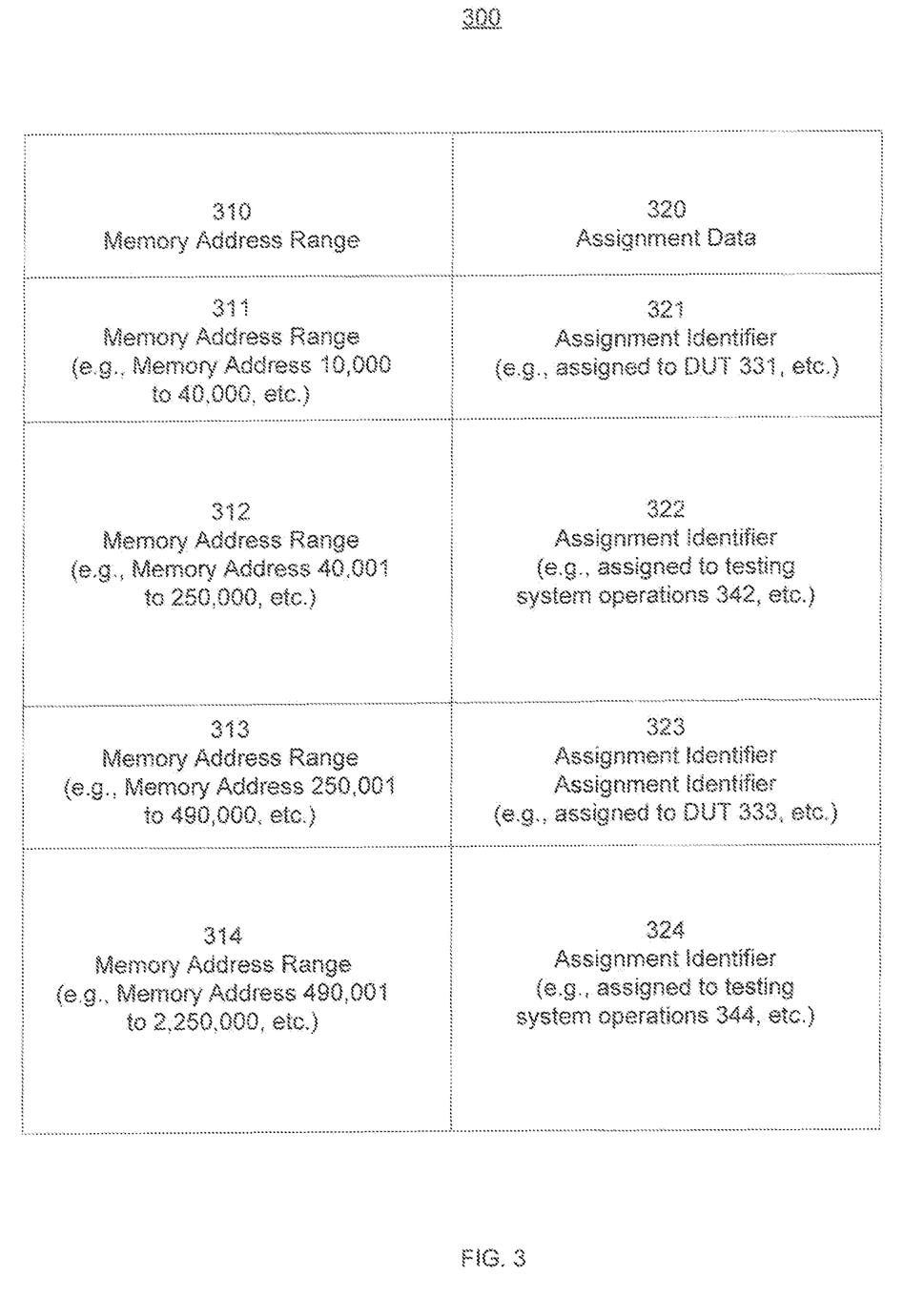
FIG. 3 is a block diagram of an exemplary memory map in accordance with one embodiment.

FIG. 3 is a block diagram of an exemplary memory map 300 in accordance with one embodiment. Memory map 300 includes memory address range column 310 and assignment column 320. Memory address range column 310 includes Memory Address range 311 (e.g., Memory Address 10,000 to 40,000, etc.) associated with Assignment Identifier 321 (e.g., assigned to DUT 331, etc.), in assignment data column 320. Memory address range column 310 includes Memory Address range 312 (e.g., Memory Address 40,001 to 250,000, etc.) associated with Assignment Identifier 322 (e.g., assigned to testing system operations DUT 342, etc.), in assignment data column 320. Memory address range column 310 includes Memory Address range 313 (e.g., Memory Address 250,001 to 490,000, etc.) associated with Assignment Identifier 323 (e.g., assigned to DUT 333, etc.), in assignment data column 320. Memory address range column 310 includes Memory Address range 314 (e.g., Memory Address 490,001 to 40,000, etc.) associated with Assignment Identifier 334 (e.g., assigned to DUT 334, etc.), in assignment data column 320.

Figure 4:
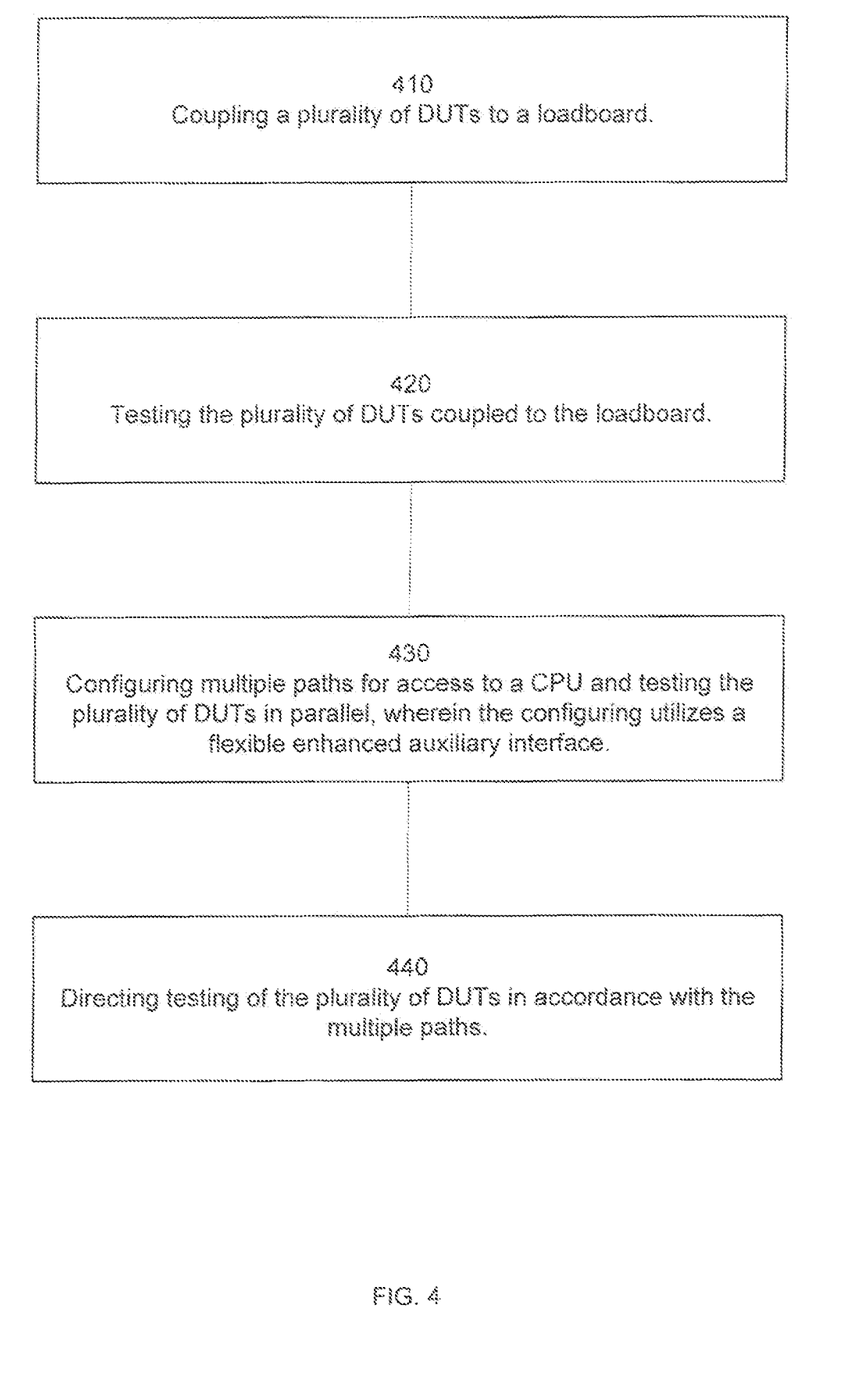
FIG. 4 is a flow chart of exemplary enhanced interface method in accordance with one embodiment.

FIG. 4 is a flow chart of exemplary enhanced interface method 400 in accordance with one embodiment. In one embodiment, configuring of multiple paths for access to the CPU novel flexible memory mapped interface can be utilized to direct testing DUTs rather than a limited I/O space approach.

In block 410 a plurality of DUTs are coupled to a loadboard. In one embodiment, the DUTs are NVMe devices with a universal asynchronous receiver-transmitter (UART) UART interface. The DUTs can be Non Volatile Memory Express (NVMe) solid state drives (SSDs).

In block 420 the plurality of DUTs are tested. The plurality of DUTs can be tested in parallel.

In block 430 the multiple paths are configured for access to a CPU and testing the plurality of DUTs in parallel. In one embodiment, the configuring utilizes a flexible enhanced auxiliary interface. In one exemplary implementation, the configuring multiple paths for access to the CPU enables the number of serial buses to increase beyond limitations of an I/O space address of the CPU.

In block 440 testing of the plurality of DUTs is directed in accordance with the multiple paths. In one embodiment, the directing testing of the plurality of DUTs includes directing debug operations. In one exemplary implementation, the directing testing of the plurality of DUTs includes providing for test systems with multi-function devices that can work in an environment with multiple DUTs per CPU.

Figure 5:
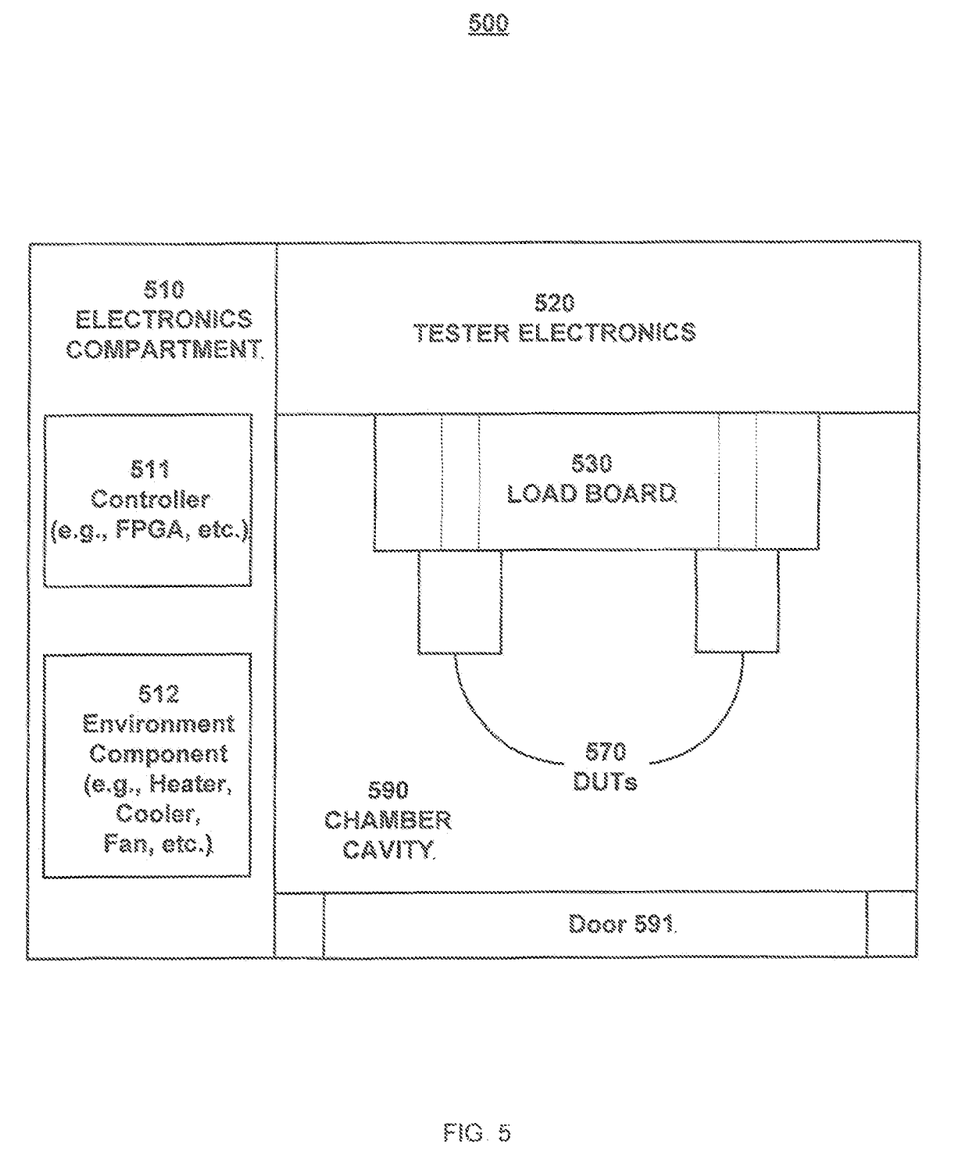
FIG. 5 is a block diagram of an exemplary testing system in accordance with one embodiment.
Figure 6:
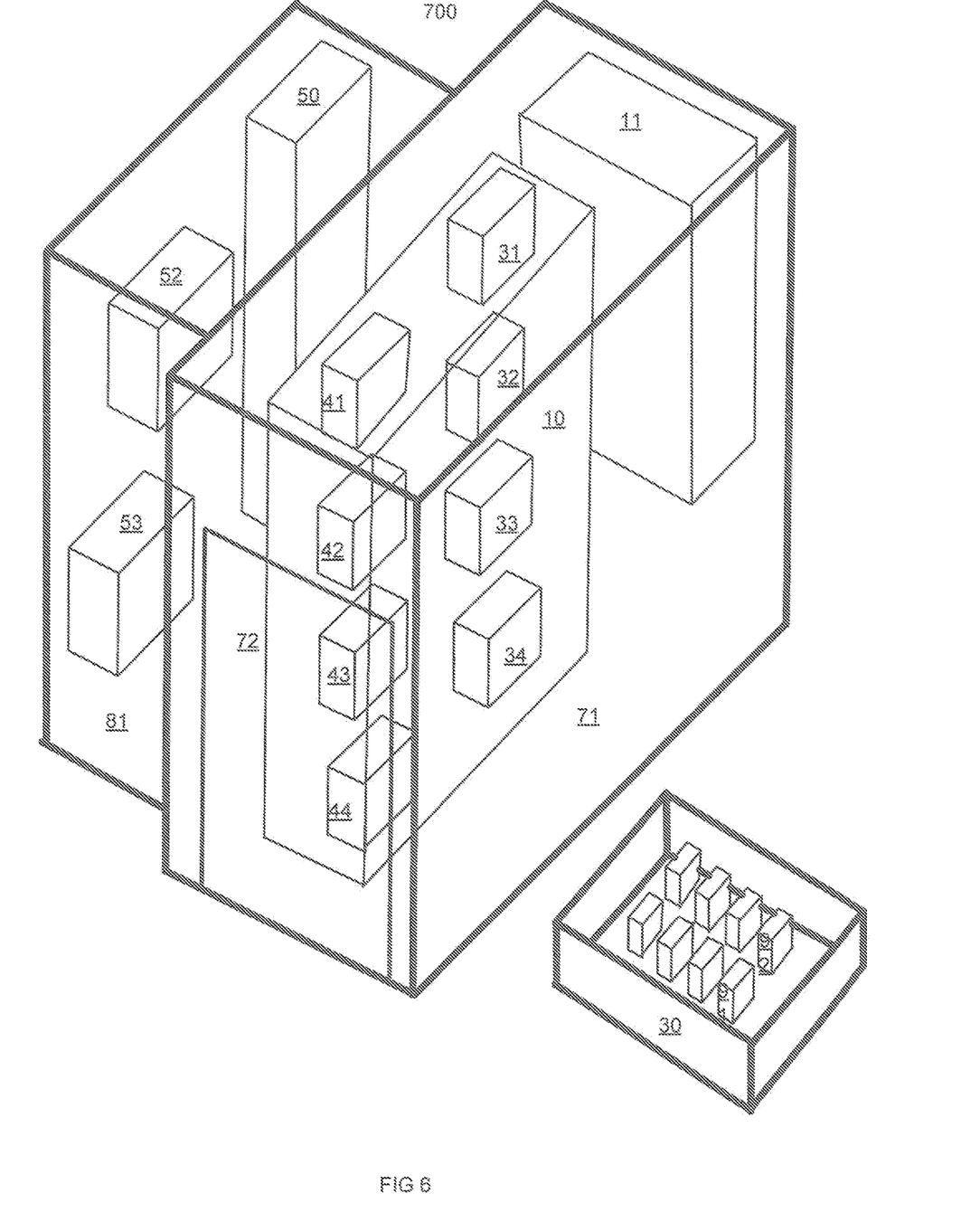
FIG. 6 is a block diagram of an exemplary testing system in accordance with one embodiment.
Figure 7:
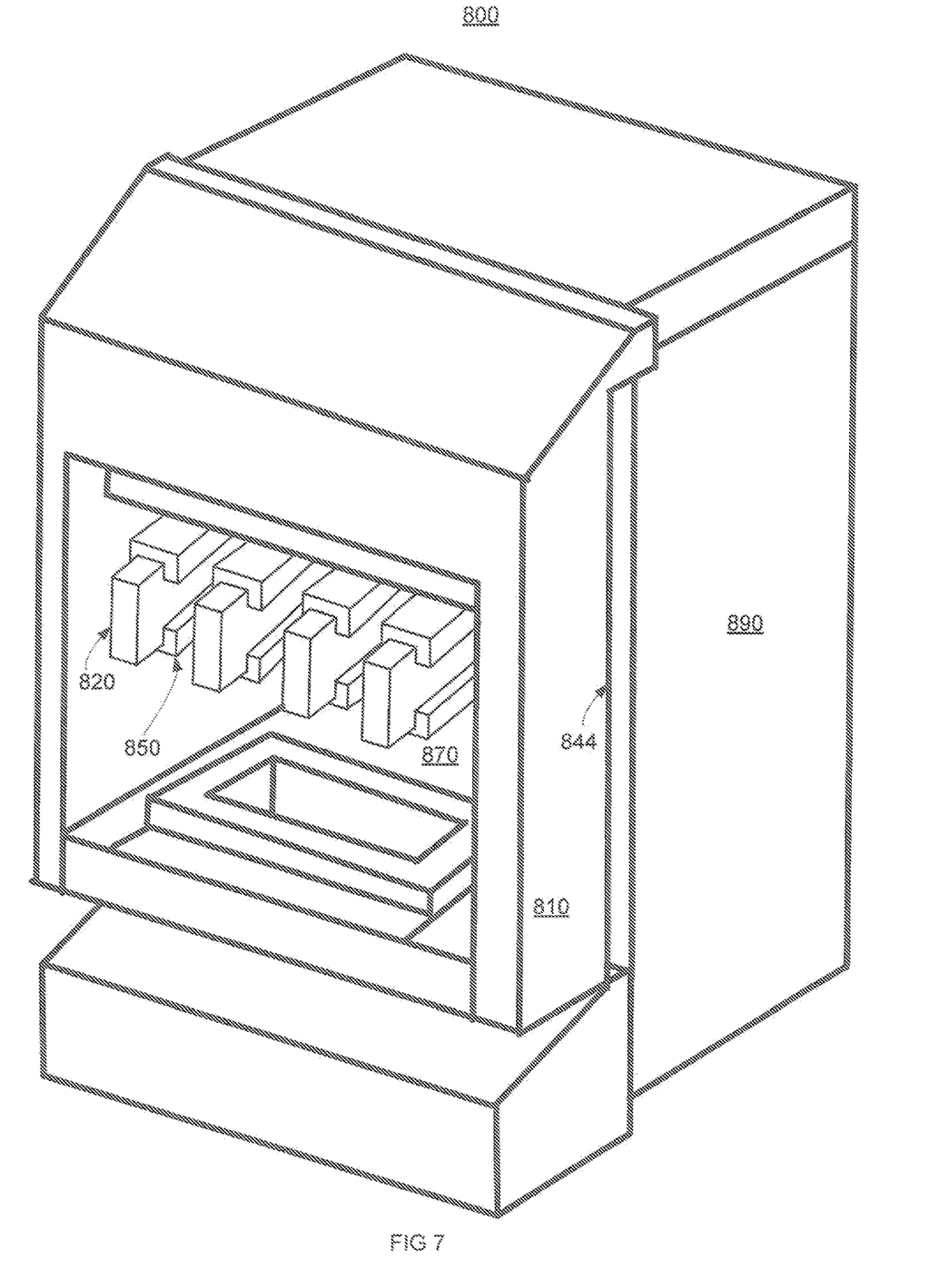
FIG. 7 is a block diagram of another exemplary test system in accordance with one embodiment.

In one embodiment, enhanced auxiliary interface test systems and methods can be implemented in test systems similar to the embodiments shown in the FIGS. 5, 6, and 7.

FIG. 5 is a block diagram of an exemplary testing system 500 in accordance with one embodiment. Testing system 500 includes electronics compartment 510 and tester electronics 520, loadboard 530, DUTs 570, and testing chamber 590 with door 591. Electronics compartment 510 includes controller 511 and environment compartment 512.

It is appreciated that selectable testing systems and methods can be implemented in various testing system configurations or approaches. FIG. 6 is a block diagram of an exemplary testing system in accordance with one embodiment. It consists of a large controlled environmental chamber or oven 71 that contains an oven rack 10 and heating and cooling elements 11. The oven rack 10 contains devices under test (DUTs) in a number of loadboard trays 31, 32, 33, 34, 41, 42, 43, and 44. The environmental test chamber 71 has solid walls and a solid door 72 that enclose the test rack 10. The heating and cooling elements 11 can have a wide temperature range (e.g., −10 to 120 degrees C.). The tester or test head 81 contains various racked components, including system controller network switches 52, system power supply components 53, and tester slices 50 (the tester slice contains the tester electronics). The loadboard trays (e.g., 30, 31, etc.) are connected to tester slices 50 (multiple loadboard trays can be coupled to a single tester slice). There is also a block diagram of a tester tray 30 and devices under test (e.g., 91, 92, etc.). The loadboard trays are manually populated with devices under test. The full tester trays (e.g., 30, 31, etc.) are manually inserted into environmental chamber 71 and manually connected to the tester electronics (e.g., 50, 52, 53, etc.). This process can be labor intensive and cumbersome (e.g., the process requires opening the door 72 of the environmental chamber 71 and manually trying to insert the trays though the door 72 into the appropriate location).

In one embodiment, a test system includes a device interface board and tester electronics that control testing operations. The tester electronics can be located in an enclosure which together are referred to as the primitive. The device interface board has a device under test access interface that allows physical manipulation of the devices under test (e.g., manual manipulation, robotic manipulation, etc.). A device under test can be independently manipulated physically with little or no interference or impacts on testing operations of another device under test. Device interface boards and their loadboards can be conveniently setup to accommodate different device form factors. In one embodiment, loadboards are configured with device under test interfaces and universal primitive interfaces. In one exemplary implementation, the device interface board can control an ambient environment of a device under test FIG. 8 is a block diagram of an exemplary test system 800 in accordance with one embodiment. Test system 800 includes a testing primitive 890 (e.g., containing the testing control hardware and power supply components for the devices under test, etc.) and a device interface board (DIB) 810 disposed in front of and coupled to the primitive 890. In one embodiment, the device interface board 810 is a partial enclosure. The loadboard is also coupled to and electrically interfaces with the primitive 890 to obtain power and high-speed electrical signals for testing the device under test 820. The device interface board can include air flow channels 844 that allow air flow to and from the device under test environment. The air flow channels 844 can include baffles. The device interface board 810 partial enclosure includes a device under test access interface 870 that enables easy physical access (e.g., unobstructed, unimpeded, etc.) to the devices under test. Environmental control components 811 and 814 control and maintain device under test ambient environmental conditions (e.g., temperature, air flow rate, etc.). The environmental control components can create an environmental envelope that prevents or mitigate interference from outside environmental conditions on the operations of devices under test. While access to test system 800 may be easier than test system 700, test system configuration adapters enable both supplemental operations and functional testing that still offers benefits associated with not requiring the expensive and time-consuming multiple moves of DUTs between separate test systems (unlike conventional test approaches).

The enhanced auxiliary interface systems and methods can flexibly increase parallelism enabling more efficient and effective testing and debugging. The enhanced auxiliary interface systems and methods can enable greater parallel DUT testing per CPU. This in effect helps avoid or loosen the traditional direct/strict limiting correlation between I/O spaces and the number of devices that can be tested in parallel. A user or customer can opt to go through the novel flexible memory mapped interface of the enhanced auxiliary interface systems and methods rather than the traditional limited I/O space approach. Thus, enhanced auxiliary interface systems and methods can overcome CPU I/O space limitations enabling more DUTS to be tested in parallel than traditional approaches.

While the invention has been described in conjunction with the preferred embodiments, it will be understood that they are not intended to limit the invention to these embodiments. On the contrary, the invention is intended to cover alternatives, modifications, and equivalents. The description is not intended to be exhaustive or to limit the invention to the precise forms disclosed, and obviously many modifications and variations are possible.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

It is appreciated that embodiments of the present invention can be compatible and implemented with a variety of different types of tangible memory or storage (e.g., RAM, DRAM, flash, hard drive, CD, DVD, etc.). The memory or storage, while able to be changed or rewritten, can be considered a non-transitory storage medium. By indicating a non-transitory storage medium it is not intend to limit characteristics of the medium, and can include a variety of storage mediums (e.g., programmable, erasable, nonprogrammable, read/write, read only, etc.) and "non-transitory" computer-readable media comprises all computer-readable media, with the sole exception being a transitory, propagating signal.

It is appreciated that the description includes exemplary concepts or embodiments associated with the novel approach. It is also appreciated that the listing is not exhaustive and does not necessarily include all possible implementation. The concepts and embodiments can be implemented in hardware, firmware, software, and so on. In one embodiment, the methods or process describe operations performed by various processing components or units. In one exemplary implementation, instructions, or directions associated with the methods, processes, operations etc. can be stored in a memory and cause a processor to implement the operations, functions, actions, etc.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the claim.

What is claimed is:

1. An enhanced auxiliary interface test system comprises:
   a load board configured to couple with a plurality of devices under test (DUTs);
   testing electronics configured to test the plurality of DUTs, wherein the testing electronics are coupled to the load board;
   a controller configured to direct testing of the DUTs, wherein the controller is coupled to the testing electronics; and
   a memory mapped interface configured to implement multiple paths to access a central processing unit (CPU) on the controller and enable testing of multiple DUTs in parallel, wherein the memory mapped interface is supported by modifications to a field programmable gate array (FPGA), a driver, and a user space.

2. An enhanced auxiliary interface test system of claim 1 wherein the plurality of DUTs are non-volatile memory express (NVMe) devices with a universal asynchronous receiver-transmitter (UART) interface.

3. An enhanced auxiliary interface test system of claim 2 wherein the NVMe devices have a UART interface over peripheral component interconnect express (PCIe).

4. An enhanced auxiliary interface test system of claim 1 wherein the plurality of DUTs are peripheral component interconnect express (PCIe) Non Volatile Memory Express (NVMe) solid state drives (SSDs).

5. An enhanced auxiliary interface test system of claim 1 wherein the controller provides for test systems with multi-function devices that can work in an environment with more than one of the plurality of DUTs per central processing unit (CPU).

6. An enhanced auxiliary interface test system of claim 1 wherein the memory mapped interface enables a first number of serial buses to increase to a second number of serial buses, wherein the second number of serial buses is beyond limitations of an input/output (I/O) space address of the controller, which in turn enables more devices to be connected and tested at least in part concurrently or in parallel.

7. An enhanced auxiliary interface test method comprising:
   coupling a plurality of devices under test (DUTs) to a loadboard;
   testing the plurality of DUTs coupled to the loadboard;
   configuring multiple paths for access to a central processing unit (CPU) and testing the plurality of DUTs in parallel, wherein the configuring utilizes a flexible enhanced auxiliary interface;
   modifying a field programmable gate array (FPGA), a driver, and a user space to support the flexible enhanced auxiliary interface; and
   directing testing of the plurality of DUTs in accordance with the multiple paths.

8. An enhanced auxiliary interface test method of claim 7 wherein the DUTs are NVMe devices with a universal asynchronous receiver-transmitter (UART) interface.

9. An enhanced auxiliary interface test method of claim 7 wherein the directing testing of the plurality of DUTs includes directing debug operations.

10. An enhanced auxiliary interface test method of claim 7 wherein the directing testing of the plurality of DUTs included providing for test systems with multi-function devices that can work in an environment with more than one of the plurality of DUTs per the CPU.

11. An enhanced auxiliary interface test method of claim 7 wherein the configuring multiple paths for access to the CPU enables a first number of serial buses to increase to a second number of serial buses, wherein the second number of serial buses is beyond limitations of an input/output (I/O) space address of the CPU.

12. An enhanced auxiliary interface test method of claim 7 includes utilizing the configuring of the multiple paths for access to the flexible enhanced auxiliary interface rather than a limited input/output I/O space approach.

13. An enhanced auxiliary interface test method of claim 7 wherein the DUTs are peripheral component interconnect express (PCIe) Non Volatile Memory Express (NVMe) solid state drives (SSDs).

14. An enhanced auxiliary interface test system comprising:
   a load board configured to couple with a plurality of devices under test (DUTs);
   testing electronics configured to test the plurality of NVMe devices with a universal asynchronous receiver-transmitter (UART) interface, wherein the testing electronics are coupled to the load board;
   a controller configured to direct testing of the DUTs, wherein the controller is coupled to the testing electronics; and
   a flexible enhanced auxiliary interface configured to implement multiple paths to access a central processing unit (CPU) on the controller and enable testing of multiple NVMe devices in parallel, wherein the flexible enhanced auxiliary interface is supported by modifications to a field programmable gate array (FPGA), a driver, and a user space.

15. An enhanced auxiliary interface test system of claim 14 wherein a first number of DUTs to be to be tested in parallel is not constrained by input/output (I/O) space limitations of the CPU.

16. An enhanced auxiliary interface test system of claim 14 wherein the flexible enhanced auxiliary interface includes a memory mapped interface.

17. An enhanced auxiliary interface test system of claim 14 wherein the flexible enhanced auxiliary interface provides for test systems with multi-function devices that can work in an environment with more than one of the plurality of DUTs per the CPU.

\* \* \* \* \*

UNITED STATES PATENT AND TRADEMARK OFFICE
CERTIFICATE OF CORRECTION

| | | |
|---|---|---|
| PATENT NO. | : 11,899,550 B2 | Page 1 of 1 |
| APPLICATION NO. | : 17/161417 | |
| DATED | : February 13, 2024 | |
| INVENTOR(S) | : Yuan et al. | |

It is certified that error appears in the above-identified patent and that said Letters Patent is hereby corrected as shown below:

In the Claims

In Claim 1, Column 7, Line 39, please insert -- plurality of -- in between the and DUTs;
In Claim 1, Column 7, Line 44, please insert -- the -- in between enable and testing; and
In Claim 1, Column 7, Lines 44-45, please insert -- of the plurality of DUTs -- in between DUTs and in.

In Claim 7, Column 8, Line 10, please insert -- the -- in between "and" and testing;
In Claim 7, Column 8, Line 12, please insert -- and -- after the ";"; and
In Claim 7, Column 8, Line 16, please insert -- the -- in between directing and testing.

In Claim 8, Column 8, Line 19, please insert -- plurality of -- in between the and DUTs; and
In Claim 8, Column 8, Line 19, please delete "NVMe" and insert -- Non-Volatile Memory Express (NVMe) --.

In Claim 9, Column 8, Line 22, please insert -- the -- in between directing and testing.

In Claim 10, Column 8, Line 25, please insert -- the -- in between directing and testing; and
In Claim 10, Column 8, Line 26, please delete "included" and insert -- includes --.

In Claim 13, Column 8, Line 40, please insert -- plurality of -- in between the and DUTs.

In Claim 14, Column 8, Line 48, please delete "NVMe" and insert -- DUTs, wherein the plurality of DUTs comprise Non-Volatile Memory(NVMe) --;
In Claim 14, Column 8, Line 51, please insert -- plurality of -- in between the and DUTs;
In Claim 14, Column 8, Line 56, please insert -- the -- in between enable and testing; and
In Claim 14, Column 8, Line 57, please insert -- of the plurality of DUTs -- in between devices and in.

In Claim 15, Column 8, Line 62, please insert -- the plurality of -- in between of and DUTs.

Signed and Sealed this
Nineteenth Day of March, 2024

Katherine Kelly Vidal
*Director of the United States Patent and Trademark Office*